Aug. 23, 1932.   C. MESSICK ET AL   1,872,782

REGISTERING DEVICE

Filed July 5, 1929   5 Sheets-Sheet 1

INVENTORS
Charlton Messick and
Alexander S. Langsdorf,
by Cantlan & Gravely,
THEIR ATTORNEYS.

Aug. 23, 1932.  C. MESSICK ET AL  1,872,782
REGISTERING DEVICE
Filed July 5, 1929  5 Sheets-Sheet 2

Aug. 23, 1932.  C. MESSICK ET AL  1,872,782
REGISTERING DEVICE
Filed July 5, 1929     5 Sheets-Sheet 3

INVENTORS:
Charlton Messick and
Alexander S. Langsdorf,
by Carr & Carr
THEIR ATTORNEYS.

Aug. 23, 1932.    C. MESSICK ET AL    1,872,782
REGISTERING DEVICE
Filed July 5, 1929    5 Sheets-Sheet 4

INVENTORS
Charlton Messick and
Alexander S. Langsdorf,
by Lawson Gravely,
THEIR ATTORNEYS Patented Aug. 23, 1932

1,872,782

UNITED STATES PATENT OFFICE

CHARLTON MESSICK AND ALEXANDER S. LANGSDORF, OF ST. LOUIS, MISSOURI

REGISTERING DEVICE

Application filed July 5, 1929. Serial No. 375,915.

Our invention relates to devices for automatically registering the number of persons entering and leaving a doorway and is particularly adapted for registering the number of persons entering and leaving a railway car, bus, street car or other vehicle. The invention has for its principal objects a device for automatically making such inbound and outbound registrations, without the conscious cooperation of the persons making the record and without interfering with normal ingress to the doorway and egress therefrom, to provide means for insuring accurate registering and for preventing interference with such accurate registering, to provide registering means for railway cars whereby separate counts may be made of persons entering and leaving at each stop and of the distance traveled and whereby a record is made from which the distance that each person travels may be computed regardless of how often he may leave and reboard the car at any point or pass from car to car, and regardless of how many persons may board the car at any point and leave it at the same point; so that at the end of a run can be computed just what returns are due from the conductor of the train. Other objects and advantages will appear hereinafter.

The invention consists in the registering device and in the parts and combinations and arrangements of parts hereinafter described and claimed.

In the accompanying drawings, which form part of the specification and wherein like reference characters indicate like parts wherever they occur.

At the doorway, or other opening used jointly as an entrance and exit, two treads, A and B, (Figs. 16 to 20) are permanently fastened to the floor, the former just outside the sill of the doorway, the latter just inside. In order to obviate possible interference with the accuracy of the registration, the two treads, A and B are placed at different elevations, so as to give the effect of a step up or down, the object of this arrangement being to prevent the possibility of the two treads being depressed simultaneously by one foot of an individual entering or leaving the doorway.

Figures 16, 17, 18, 19, 20, 21:
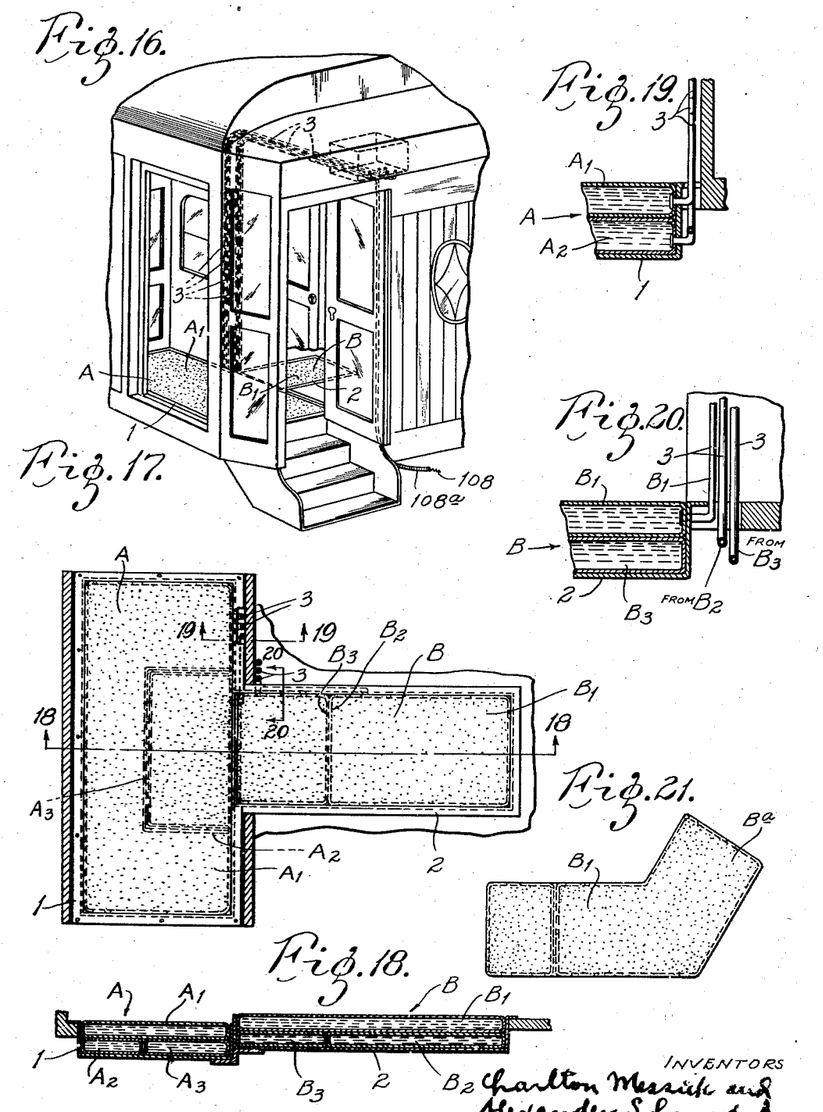
Fig. 16 is a perspective view of the platform and doorway of a railway car, the location of the registering mechanism being indicated in dotted lines.
Fig. 17 is a plan view of the tread devices actuated by persons entering or leaving the doorway.
Fig. 18 is a sectional view on the line 18—18 of Fig. 17.
Fig. 19 is a sectional view on the line 19—19 of Fig. 17.
Fig. 20 is a sectional view on the line 20—20 of Fig. 17.
Fig. 21 is a plan view of a slightly modified form of tread member for the inside of the car, said tread member being angularly shaped.

Tread A comprises a cast iron or pressed steel base 1, which serves to support a set of three rubber fabric bags or containers $A_1$, $A_2$, $A_3$, while tread B consists similarly of a metal base 2 which supports elastic containers $B_1$, $B_2$, $B_3$. The containers $A_1$ and $B_1$ each cover the whole area within their respective bases, while containers $A_3$ and $B_3$, located under $A_1$ and $B_1$ respectively, are located on either side of the doorway. Containers $A_2$ and $B_2$ occupy the remaining space under $A_1$ and $B_1$. Treads A and B, each made up of the parts described, are so constructed that A and B, while at slightly different elevations, shall be contiguous to eliminate the dead space that would otherwise be occupied by a sill. Fig. 21 illustrates a slight modification in which the treads $B_1$ and $B_2$ have an angularly offset portion $Ba$, being shaped to fit the entranceway of a Pullman car. This or other angular shape may be used, together with guide rails or the like where it is desirable to have passengers follow an angular course, as on busses or elsewhere where space is limited.

Figures 4, 5, 6, 7, 7A:
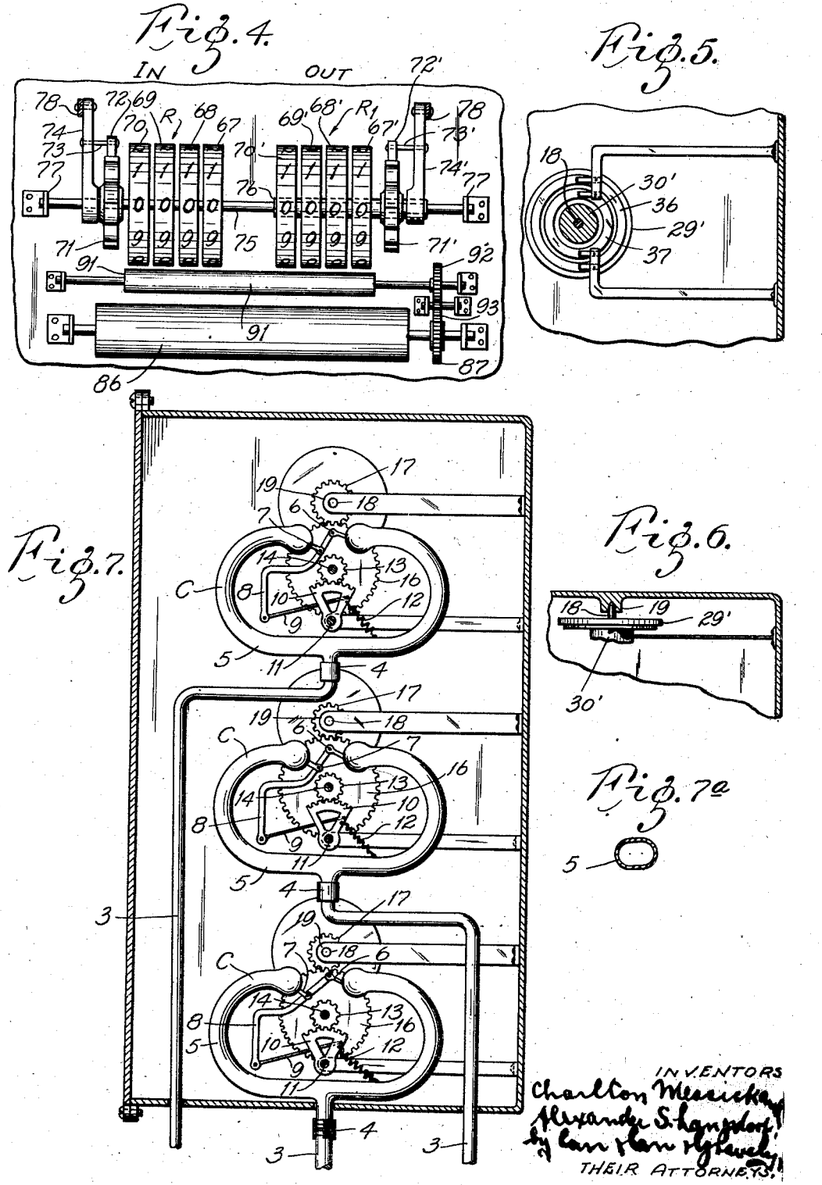
Fig. 4 is a front elevation of a portion of the recording and printing mechanism on line 4—4 of Fig. 2.
Fig. 5 is a detail view on line 5—5 of Fig. 1.
Fig. 6 is a detail plan view of Fig. 5.
Fig. 7 is an enlarged sectional view on the line 7—7 of Fig. 1, showing the pressure responsive actuating devices for the registering mechanism.
Fig. 7a is a section of a Bourdon tube forming part of the actuating mechanism for the registering device.

Each of the six elastic containers comprising treads A and B is connected by means of a small rigid pipe 3 to a Bourdon gauge C of which there are six in all. Each container and its associated pipe is filled with a non-freezing liquid up to the point of attachment to the gauge. Three of these gauges are illustrated in Fig. 7. (See also Fig. 1.) Each small pipe 3 having rigid walls (such as a gas pipe) is attached at one end to one of the flexible containers of a tread A or B and is connected at its other end, by means of a coupling 4 to the middle of a flexible brass tube 5 having an oval or elliptical cross section, as shown in Fig. 7a. The tube 5 is closed at its ends, and is bent into approximately circular form with its closed ends spaced apart. Attached to the closed ends of the tube 5 are lugs, 6 and 7 to which is pivoted a bent link 8; the latter is in turn pivoted to a link 9 which is pivotally connected to a segmental toothed gear 10 pivoted at 11. The gear 10 is restrained by a spring 12 which serves to restore the gear 10 to its normal position after it has been displaced by the pull of the link 9. The gear 10 meshes with a pinion 13 which is firmly attached to a shaft 14, the latter supported in suitable bearings 15.

Figure 1:
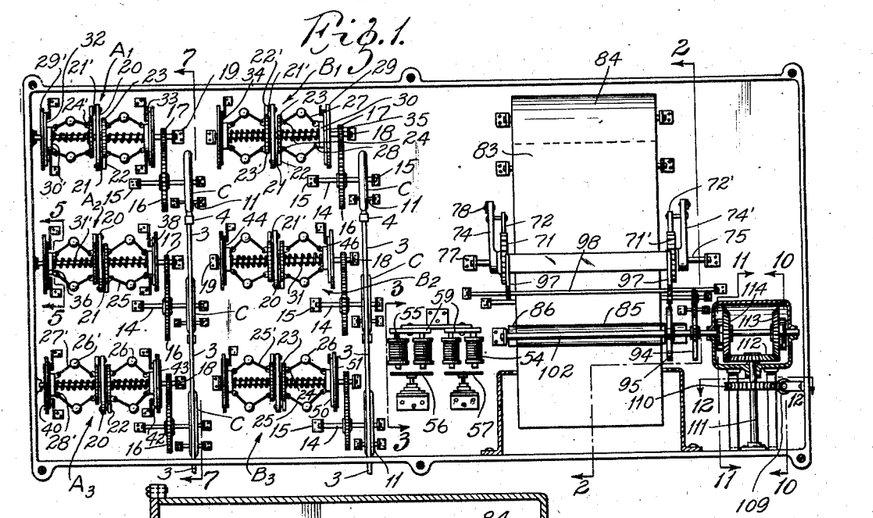
Fig. 1 is a diagrammatic assembly view of a registering device embodying our invention, as used in a railway passenger car, bus, street car, etc.

Associated with each of the six gauges of the type shown in Fig. 7 is a pair of centrifugally operated contactors, as shown in Fig. 1. Each shaft 14, driven by its pinion 13, carries a gear 16, which meshes with a pinion 17 mounted on a shaft 18, the latter supported in bearings 19. Each shaft 18 carries a disk 20 which is provided with two stub shafts 21 and $21^1$ diametrically opposite each other and near the periphery of the disk. The stub shaft 21 carries a pawl 22, which engages the teeth of a ratchet wheel 23, the latter being mounted freely on a sleeve supported by the shaft 18. The side face of the ratchet wheel 23 carries a pair of lugs 24 to which are pivoted links 25, which carry weights 26 at their outer ends. These weights 26 are in turn pivoted to links 27, whose other ends are attached to lugs 28 on the hub portion 30 of a disk 29. Said hub 30 slides freely on the shaft 18. The disk 29 is normally kept in its neutral position by means of a coil spring 31 interposed between the hub 30 and the wheels 23, but when the ratchet wheel 23 is rotated through the intervention of the pawl 22, the outward motion of the weights 26 causes the disk 29 to be drawn toward the ratchet wheel 23 against the compression of the spring 31. The other side of the disk 20 is provided with a set of parts $21^1$ to $31^1$, inclusive, all of which duplicate the correspondingly numbered parts above described, the only difference being that the primed parts respond to a direction of rotation of the pinion 13 which is opposite to the direction that actuates the unprimed parts. The rotation of one of these disks in one direction as one tread is released concurrently with the rotation of another of said disks in the opposite direction as another tread is depressed causes registration of each person actually entering and leaving; and improper registration is prevented by means of circuits and mechanism hereinafter described.

Figure 9:
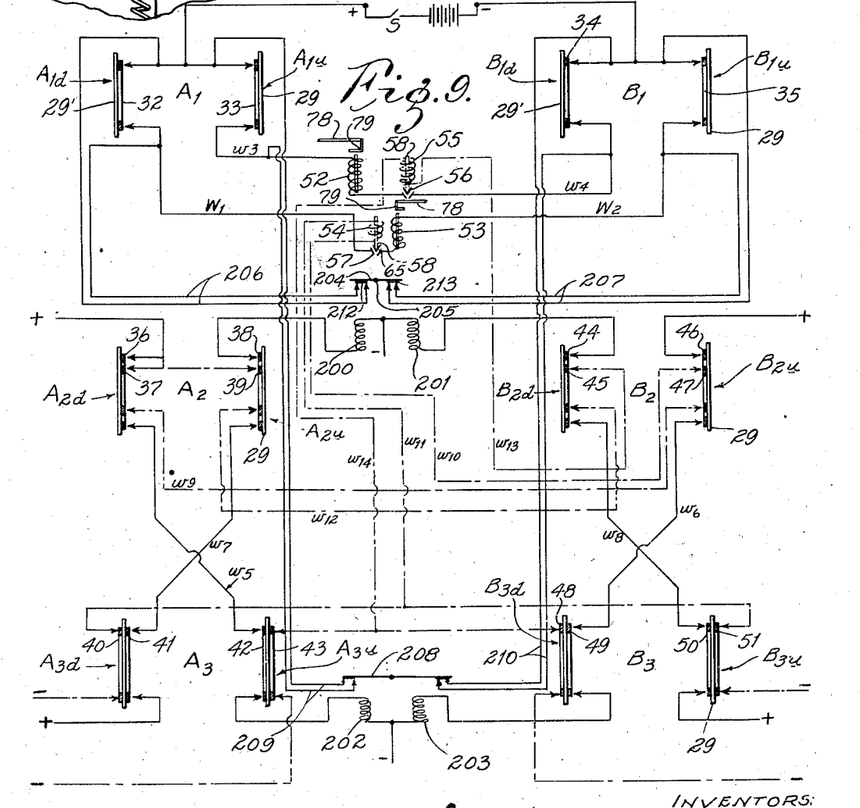
Fig. 9 is a wiring diagram.

Attached to the several disks 29, $29^1$, but insulated therefrom, are annular metallic rings 32 to 51, inclusive, as shown diagrammatically in Fig. 9. In this diagram each pair of disks is marked to indicate the tread member ($A_1$, $A_2$, $A_3$, $B_1$, $B_2$, or $B_3$) with which it is associated. Associated with each ring is a pair of brushes, indicated in Fig. 9 by the arrow-heads, the brushes being mounted on brush holders not shown in Fig. 9, but illustrated in Figs. 5 and 6. The subscripts "$d$" and "$u$" appearing in Fig. 9 represents the words "down" and "up", respectively, indicating, for example, that a depression of container $A_1$ will cause the gauge to bring about a motion of disk $29^1$ toward the center (i. e., towards disk 20) and establish an electrical connection with the brushes. Release of pressure on any of the containers is here regarded as an "up" movement of the gauge, which then establishes electrical connections on the other side of the centrifugal device.

The electrical connections of Fig. 9 are arranged in such a manner as to energize electromagnets 52, 53, 54, and 55 by means of current from a storage battery or other suitable source of direct current which is so connected that its positive terminal connects to all points marked +, and its negative terminal to all points marked −; likewise, in the manner hereinafter described, the battery or other equivalent source energizes the windings 200, 201, 202 and 203 of two differential relays, one of which is shown in detail in Fig. 9a. Electromagnet 52 operates the inbound register R, while electromagnet 53 operates the outbound register $R^1$. Electromagnets 54 and 55, when energized, serve to trip the electromagnets 53 and 52, respectively, by the simple expedient of opening the circuit at switches 57 and 56, which are normally closed; said electromagnets 54 and 55 are energized only by fortuitous actuation of the tread members due to certain movements of passengers which, without these trip devices, might cause registrations to take place when in fact there is neither entrance nor exit of a passenger.

Figure 3:
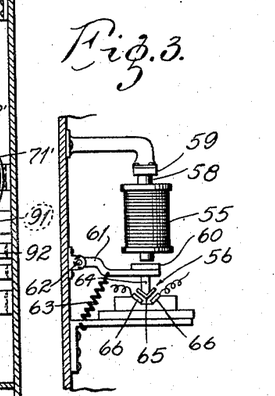
Fig. 3 is a view looking in the direction of the arrows on line 3—3 in Fig. 1.

Both of these switches 56 and 57 are normally closed, and their movable parts are operated respectively by the electromagnets 55 and 54, in substantially the manner illustrated in Fig. 3. This gives the details of the electromagnet 55 and its associated parts, which are identical with those of the electromagnet 54. The coils 55 are wound on cores 58 joined by a yoke 59 (see also Fig. 1); the armature 60 is carried on an arm 61 which is pivoted at 62 and which is held down by a spring 63. The arm 61 carries an insulating stud 64 upon which is mounted a copper contact piece 65 which serves to connect the two contact plates 66 of switch 56.

Reference to the upper part of Fig. 9 will show that in general the depression of $A_1$ (symbolized by $A_{1d}$) occurring simultaneously with a release of $B_1$ (symbolized by $B_{1u}$) will energize 53 and so produce an outbound registration; for a circuit is established from the positive to the negative terminal of the battery (or other source of current) through electromagnet 53 by way of the contact ring 32, wire $W_1$, coil 53, wire $W_2$ and contact ring 35. Similarly a release of $A_1$ (symbolized by $A_{1u}$) when accompanied by a simultaneous depression of $B_1$ ($B_{1d}$) will produce an inbound registration through the circuit including contact ring 33, wire $W_3$, coil 52, wire $W_4$, and contact ring 34. Obviously, a depression (or release) of $A_1$ will be accompanied by a simultaneous depression (or release) of either $A_2$ or $A_3$, depending upon the point where pressure is applied (or released); and similarly with respect to the set of B mats. But these particular effects upon the lower set of mats do not in any way interfere with the correctness of the registration.

It may happen, however, that just as one person is stepping from a point on $A_1$, just above $A_3$, to a part of $B_1$, just above $B_3$, as in normally entering the doorway, another following individual may step on $A_1$ just over $A_2$; and the first may remove his weight from $A_1$ just as the second applies his weight, in which case the fluid in $A_1$ may have no resultant displacement. The contactor $A_1$ would then fail to function, and unless this contingency is prevented the actual inbound passage of the first individual would not be recorded. What is needed to guard against this condition is the provision of means for completing the circuit at contactor $A_{1u}$, and it must be operated by the combination of contacts symbolized by $A_{3u}$—$A_{2d}$. Reference to Fig. 9 will show that this combination establishes a circuit from the positive terminal of the supply circuit through contact ring 36 of $A_2$ by way of $W_5$ to contact ring 42 of $A_3$, thence through coil 202 back the negative terminal of the supply circuit. Electromagnet 202 pulls down the pivoted armature 208, and thereby establishes a contact between the ends of the pair of wires 209, whose other ends are connected to the brushes at $A_{1u}$ (ring 33). This serves to bridge the contact $A_{1u}$ under the circumstances described above, and so permits the inbound registration to be effected.

A similar failure to record an inbound registration would occur if a passenger steps in upon $B_1$, just above $B_3$, just as another steps off from $B_1$, from a point above $B_2$. The liquid in $B_1$, would not be disturbed (or not to a sufficient extent), so contact $B_{1d}$ would fail to operate. But under these circumstances contact $B_{1d}$ is bridged by the pair of wires 210; for the combination $B_{2u}$—$B_{3d}$ establishes a circuit from the positive terminal of the supply circuit by way of contact ring 46 of $B_2$ through wire $W_6$ to contact ring 49 of $B_3$, thence through coil 203 to the negative side of the supply circuit, and the pull of coil 203 attracts the pivoted lever 208 to a contact with wires 210.

In precisely the same manner the combination $A_{3d}$—$A_{2u}$ establishes a circuit through coil 200 by way of ring 41, wire $W_7$ and ring 38, thus bridging $A_{1d}$ by means of the pair of wires 206. Also the combination $B_{3u}$—$B_{2d}$ energizes coil 201 by way of ring 50, wire $W_8$, and ring 44 thereby bridging $B_{1u}$ by means of the pair of wires 207.

In the above description it will be noted that the combination $A_{3d}$—$A_{2u}$, by energizing magnet 200, would of itself by-pass $A_{1d}$ and so prepare the way for an outbound registration in case contact $B_{1u}$ is closed. But contact $B_{1u}$ will be by-passed by the combination $B_{2d}$—$B_{3u}$, if the latter acts alone, through the action of magnet 201 upon the pair of wires 207. If however, the combinations $A_{3d}$—$A_{2u}$ and $B_{2d}$—$B_{3u}$ occur simultaneously, as might occur if one passenger moves about on $A_1$, and another on $B_1$, this simultaneity will cause the electromagnets 200 and 201 to neutralize each other provided the two coils are wound in opposite senses upon the common magnetic circuit upon which they are mounted, thus leaving lever 204 and the associated circuits 206 and 207 unaffected.

Precisely similar functions are subserved by electromagnets 202 and 203. The combination $A_{2d}$—$A_{3u}$, acting alone, energizes magnet 202, and serves to by-pass $A_{1u}$ tending to prepare for an inbound registration; the combination $B_{2u}$—$B_{3d}$, acting alone, energizes magnet 203 and serves to by-pass $B_{1d}$, this likewise tending to prepare for an inbound registration. But if both combinations occur simultaneously they neutralize each other by reason of the differential action of the coils 202 and 203 upon the common magnetic circuit, thus leaving circuits 209 and 210 unaffected.

It is likewise possible that $A_2$ (and $A_1$) may be depressed by an inbound passenger just as $B_2$ (and $B_1$) is released by another who has previously entered, which would give a false outbound registration unless means are provided to prevent this contingency. The only exception to the necessity of preventing such an outbound registration is that the simultaneity of $A_{2d}$—$B_{2u}$ is accompanied by the simultaneous occurrence $A_{3d}$—$B_{3u}$, as when a passenger actually steps from $B_3$ to $A_3$. To meet this contingency, a circuit is provided from the positive to the negative battery terminal through tripping coil 54, which when energized opens the circuit of electromagnet 53 at switch 57. Thus, starting at contact ring 37 of $A_{2d}$, which is connected to the positive terminal of the battery, there is a circuit (shown in dashed lines) through wire $W_9$ to contact ring 47 of $B_{2u}$, thence through wire $W_{10}$ to coil 54, thence through wire $W_{11}$ to a branched path through contact ring 40 of $A_{3d}$, or through contact ring 51 of $B_{3u}$, to the negative terminal. The circuit through 54 is therefore completed, and the outbound registration prevented, unless $A_{3d}$ and $B_{3u}$ are simultaneously in operation, in which case the circuit through the tripping coil 54 is broken.

In like manner, the combination $A_{2u}$—$B_{2d}$ would give a false inbound registration unless similar preventive means were provided, except that an inbound registration must take place if the combination $A_{2u}$—$B_{2d}$ is accompanied by the combination $A_{3u}$—$B_{3d}$ as when a passenger actually enters. These contingencies are provided for as follows: Starting at contact ring 39 of $A_{2u}$, which is connected to the positive battery terminal, there is a circuit (shown by dashed lines) through wire $W_{12}$ to contact ring 45 of $B_{2d}$, thence through wire $W_{13}$ to tripping coil 55 and then through wire $W_{14}$ to the negative terminal by way of the branched path through contact ring 43 of $A_{3u}$, or by way of contact ring 48 of $B_{3d}$. Tripping coil 55 actuates the switch 56 in the circuit of the inbound registering coil 52, and thus serves to prevent an inbound registration unless the combination $A_{3u}$—$B_{3d}$ opens the circuit of the tripping coil 55 at contact rings 43 and 48.

Figures 8, 9A:
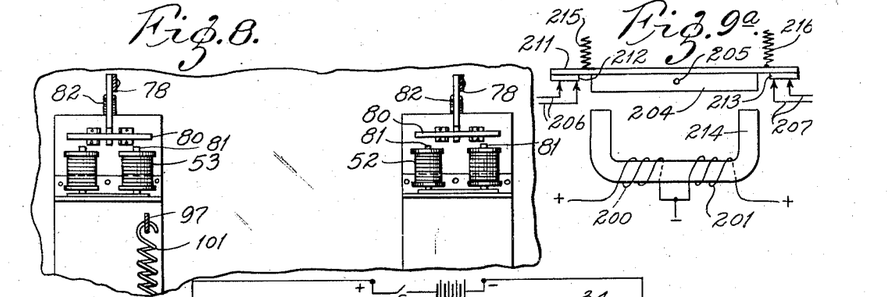
Fig. 8 is a detail view of a pair of electromagnets on the line 8—8 of Fig. 2.
Fig. 9a is a detail view of a portion of the electric system.

The two identical differential relays, one including the pairs of coils 200 and 201, the other of the pair of coils 202 and 203, are illustrated in Fig. 9a. The coils 200 and 201 are wound on the U-shaped laminated iron core 214, the magnetic circuit being completed through the iron armature 204 pivoted at 205. Attached to the armature 204 is an insulating strip 211, which carries metal (copper) contact plates 212 and 213 at its ends. These contact plates 212 and 213 are adapted to bridge the terminals of the pairs of wires 206 and 207, respectively, the ends of these wires consisting of metal brushes supported from the core 214, but insulated therefrom. The motion of the pivoted armature 204 is constrained by a pair of balanced springs 215 and 216, which normally hold the armature in a neutral position, so that the contact plates 212 and 213 do not bridge their respective circuits 206 and 207.

The recording mechanism R, $R^1$ (Fig. 4) consists of two sets of numbered dials, 67, 68, 69, 70 and $67^1$, $68^1$, $69^1$, $70^1$, the former for inbound registration, the latter for outbound registration. Dial 67 records units, 68 tens, 69 hundreds, and 70 thousands; and similarly for the corresponding primed numbers. Dial 67 is attached to shaft 75, but 68, 69 and 70 are free on this shaft, motion being imparted to them in the manner commonly used in dial counters. Similarly, dial $67^1$ it attached to a sleeve 76 which turns freely on shaft 75, the remaining dials $68^1$, $69^1$, and $70^1$, being free on sleeve 76. Shaft 75 is carried in bearings 77. The movement of the unit dials 67 and $67^1$ is effected by means of ratchet wheels 71 and $71^1$, respectively, the former attached to shaft 75, the latter to sleeve 76. The ratchet wheel 71 is actuated by a rock arm 74 which carries a pawl 72 mounted on a stub shaft 73; and similarly with respect to ratchet wheel $71^1$. The movement of the rocker arm 74 is produced by the action of the electromagnet 52, that of $74^1$ by the electromagnet 53. The intermediate parts are the same in both cases, involving a link 78, a bell crank lever 79, an armature 80, cores 81 and a restoring spring 82.

The particular arrangement of the recording dials described above is not essential to the operation of the device, and the two registers may be separately mounted if desired. The arrangement here described is mentioned because it offers a convenient method for securing a compact disposition. The arrangement of the two dials side by side in the manner shown in Fig. 4 lends itself to the production of a printed record of the dial readings for permanent reference; in this case the dials are made with embossed figures adapted to make an imprint on a paper tape. To accomplish this result for the special case in which the device is used on a railway car or other moving vehicle, the supplementary parts shown in Figs. 1, 2, 4 and 8 are provided, as described below.

When the device is used on a railway car of the vestibuled Pullman type, the entry and exit of passengers is of interest only when the car is at rest at a station, hence the mechanism need be operative only when the vestibule doors are open. At other times, that is when the car is in motion, with the doors closed, the device may be rendered inoperative, if so desired, by means of a switch S in the main circuit, Fig. 9, this switch being operated by the opening and closing of the vestibule door. The switch S may be omitted, however, if it is not considered desirable, in which case the device will always be operative and if a passenger passes from one car to another at any time, he will register out of one car and into the other.

Figure 2:
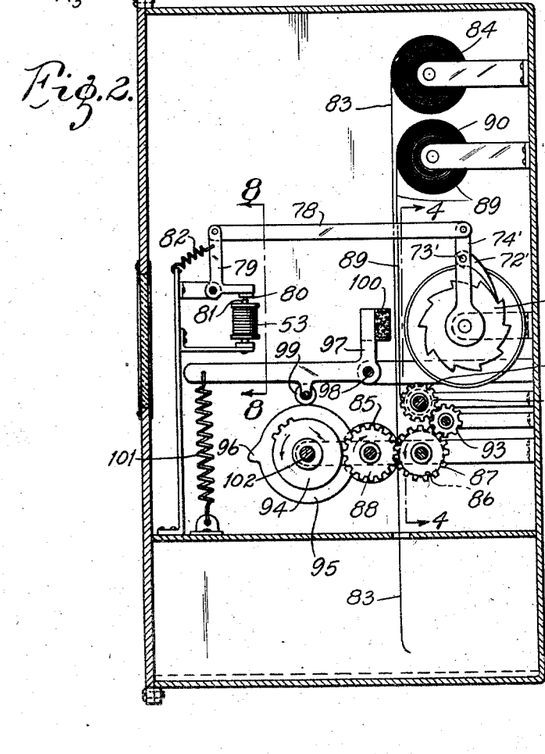
Fig. 2 is a sectional view on the line 2—2 of Fig. 1, illustrating the mechanism for printing the record.

Referring to Figs. 2 and 4 (the latter being a front elevation on line 4—4 of Fig. 2) a ribbon of paper 83, supplied from a roll 84, is held in position in front of the dials 67, 68, 69, 70 (also 67¹, 68¹, 69¹, 70¹) by means of feed rollers 85 and 86. At the ends of these feed rollers are toothed gears 87 and 88, which mesh with each other and which, when rotated, draw the paper down. Between the paper and the dials is a carbon ribbon 89 which unwinds from a reel 90 and winds up on a reel 91. The latter has a toothed gear 92 on one end, and is driven from the gear 87 by an intermediate idler gear 93, so that the same rotation of gears 87 and 88 which advances the paper also advances the carbon ribbon. The gear 88 is driven intermittently by a gear 94 mounted on a shaft 102; gear 94 as shown in Figs. 1 and 2 has three teeth, but this may be varied somewhat, the object being to advance the paper by approximately one-quarter of an inch for each revolution of shaft 102.

On the same shaft 102 which carries the special gear 94 there is mounted a cam 95, which is circular in outline except for the projecting lug 96. This lug is so formed that counter-clockwise rotation of shaft 102 will give a sharp impulse to a roller 99 carried on one arm of a bent lever 97; the latter is pivoted at 98, and carries a felt pad 100 at its upper end. The other end of the lever 97 is held down by a spring 101, one end of which is attached to a fixed point on the housing. The rotation of the cam 95 will therefore cause the felt pad 100 to strike the paper once for each revolution of shaft 102, thereby imprinting on the paper ribbon the reading of the dials at that instant. The projection 96 on cam 95 is so placed relatively to the teeth on gear 94 that the imprint is made just before the paper is advanced.

In order to secure a continuous record, the shaft 102 is driven so that it makes one complete revolution for each mile of travel of the car. It follows, then, that when the car is in motion, the successive imprints produced by a given set of dials will all be alike, provided the door switch S, Fig. 9 is used, and the number of such repeated imprints will be equal to the number of miles traveled by the passengers then on board. The actual number of passengers corresponding to the indicated length of haul is readily found by subtracting the "out" from the "in" registration.

Figures 13, 15:
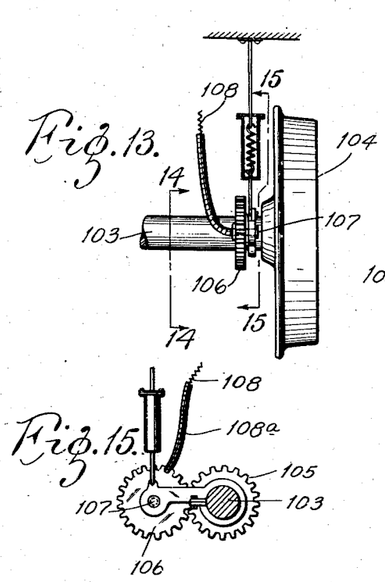
Fig. 13 is a detail view of one car wheel and a portion of the axle showing mechanism associated with the car wheel and axle for moving the recording tape as the car travels.
Fig. 15 is a view looking in the direction of the arrows 15—15 of Fig. 13.
Figure 14:
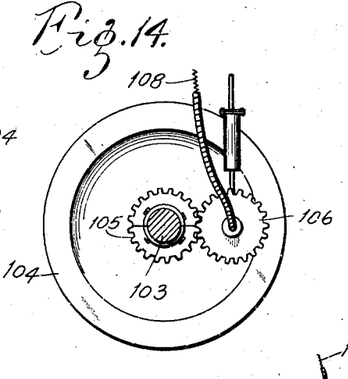
Fig. 14 is a view looking in the direction of the arrows 14—14 of Fig. 13.

The shaft 102 is driven from the car axle 103, in the manner shown in Figs. 13 and 14. In Fig. 13, one of the car wheels is indicated by 104, and on the axle 103 is bolted a ring gear 105, which may be split for convenience in installing it. The gear 105 meshes with a pinion 106 mounted on a stub shaft 107, the latter being connected through a flexible spring shaft 108 to a worm 109. The spring 108 is encased in a flexible steel tube 108a. The worm 109 meshes with a worm wheel 110 mounted on a shaft 111, the gear and worm ratios being so selected that a car travel of one mile will produce one revolution of the shaft 111. It may be necessary, in order to avoid too great a reduction in the worm gear alone, to interpose an additional gear and pinion between spring shaft 108 and worm 109, but this is a detail that does not affect the general design or operation.

Figure 10:
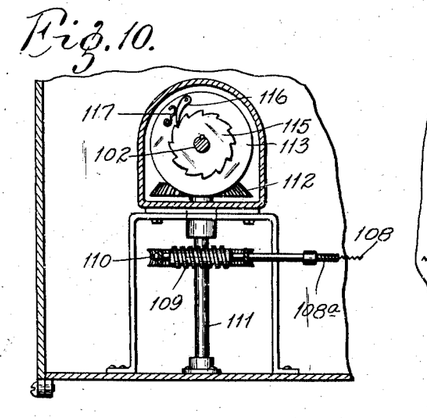
Fig. 10 is a sectional view on the line 10—10 of Fig. 1.
Figure 11:
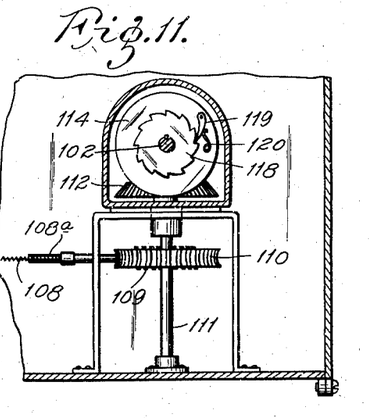
Fig. 11 is a sectional view on the line 11—11 of Fig. 1.
Figure 12:
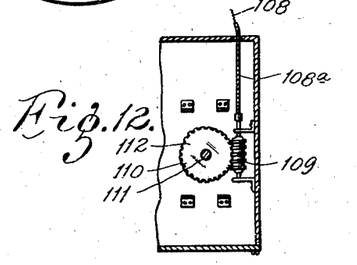
Fig. 12 is a sectional view on the line 12—12 of Fig. 1.

At the end of the shaft 111 there is mounted a small bevel gear 112 which meshes with two bevel gears 113 and 114, both mounted on shaft 102 but free to turn thereon. For a given direction of rotation of shaft 111, one of the pair of bevel gears, 113 and 114, will turn in one direction, the other in the opposite direction. As shown in Fig. 10 gear 113 is provided with a pawl 116 which engages the teeth of a ratchet wheel 115 which is rigidly attached to the shaft 102. The pawl 116 is held in position by means of a spring 117 or its equivalent. Rotation of the bevel gear 113, in the counter-clockwise direction of the drawings, will produce counter-clockwise rotation of shaft 102, but if the rotation of 113 is reversed, it has no effect upon shaft 102. Similarly, in Fig. 11 the bevel gear 114 is provided with a pawl 119 and a spring 120 so as to actuate ratchet wheel 118 for one direction of rotation only. It will be seen that without regard to the direction of rotation of shaft 111, and therefore without regard to the direction of the travel of the car, shaft 102 will always be rotated in the counter-clockwise direction; and by referring to Fig. 2 it follows that the paper will always be advanced in the same direction for each mile of travel.

The above described device has numerous advantages. It makes an accurate count of all persons entering a doorway and a separate accurate count of all persons leaving a doorway. From these figures can be computed the receipts for which the person in charge is liable, whether in the form of tickets or money. Of course, there will always be employees who are not required to pay. In the case of a railway car, the number of employees is known and can be accounted for at the end of the trip. At each station, no matter how many times the crew and passengers may get on or off, the net result will be two totals of inbound and outbound registrations whose difference will show the number of persons (passengers plus crew) actually riding from that particular stop to the next stop, which totals will be recorded. The total figures for the entire train are easily obtained by combining the totals of the several cars, but, if desired, central registering and recording mechanisms for the entire train might be provided. At the end of the run, tickets, passes and cash receipts may easily be checked against the record. In case a discrepancy is noted the exact nature thereof can be found by checking the record station by station. Each person heavy enough to depress a tread is registered and recorded. To insure complete accuracy of the conductor's reports he may be furnished with blanks to be signed as to the age of children. These statements will be used by the conductor to show that he is chargeable with a certain number of half-fare passengers or with a certain number young enough to ride free. Thus the existence of the automatic record stimulates the conductor to check up on child passengers.

In the case of a theatre or other place where persons are not allowed free privileges of leaving and reentering, means can be provided for furnishing employees and others with tokens to be used when entering and leaving; these tokens being acceptable by the auditor in lieu of money or tickets. The registration is automatic and without the knowledge of the person making it and even if the person is aware of the mechanism, it is impossible for him to make the mechanism register incorrectly or fail to register. It is not necessary for persons entering and leaving to do so in any particular way, as by staying a certain distance apart. It is even possible for different persons to go in and out simultaneously, passing each other while on the mechanism. Movement of a person over the tread members on one side of the doorway does not interfere with accurate registration when he finally steps to the other side or when some other person passes him. The tread members contain sufficient fluid and the Bourdon tube members are capable of sufficient movement that even if persons stand on the tread members, other persons entering or leaving will further depress the treads and actuate the Bourdon tubes. Piling of baggage on the platform prior to entering a station does not interfere with the operation of the device. The secondary mechanism insures the accuracy of the register by preventing registrations if a fortuitous simulation of a recording actuation occurs; and the tertiary mechanism insures proper registration if a person actually enters or leaves during fortuitous actuation of the device.

In the case of railway cars and the like, a complete record of the mile by mile travel thereof may be made, showing the number of stops and the number of people entering and leaving at each stop.

Obviously numerous changes may be made in the details of construction, and we do not wish to be limited to the precise construction shown.

What we claim is:

1. A device of the kind described comprising two collapsible liquid filled tread members outside a door, a similar tread member covering both of said tread members, each tread member being operatively connected with each of a pair of centrifugal devices, one operating when the tread is depressed and the other when the tread is raised, similar tread members and centrifugal devices inside the door, electric circuits controlled by said centrifugal devices and registering devices operated by said electric circuits.

2. A device of the kind described comprising two collapsible liquid filled tread members outside a door, a similar tread member covering both of said tread members, pipes leading from each tread member to a Bourdon tube, a pair of centrifugal devices for each Bourdon tube, one operating when the pressure of the liquid in the Bourdon tube is increased by reason of the associated tread being depressed and the other when the pressure is decreased by reason of the tread being raised (released), similar tread members inside the door and Bourdon tubes and centrifugal devices associated therewith, electric circuits controlled by said centrifugal devices and registering devices operated by said electric circuits.

3. An apparatus of the kind described comprising registering devices for registering separately persons going into an enclosure from the outside and those going out of said enclosure, primary actuating means for said registering devices, secondary means for rendering said primary devices inoperative in the event of fortuitous actuation of said primary means in the absence of persons actually entering or leaving and tertiary means for making a registration if a person actually enters or leaves during such fortuitous actuation of said primary means.

4. In a registering device for the automatic registration of persons passing through a doorway or the like, the combination of elastic treads on either side of said doorway, selectively responsive to the passage of individuals in one direction or the other, means co-operating therewith for the actuation of a register and means for preventing false registrations resulting from concurrent fortuitous release of one tread member and depression of the other.

5. In a registering device for the automatic registration of persons entering or leaving a doorway or the like, the combination of elastic treads on either side of said doorway, selectively responsive to the passage of individuals in one direction or the other, means co-operating therewith for the actuation of separate inbound and outbound registers and means for preventing false registrations resulting from concurrent fortuitous release of one tread member and depression of the other.

6. A device for automatically registering the number of persons passing through a doorway or the like comprising depressible tread members on either side of the doorway, registering means actuated by the release of one tread member and the depression of the other tread member by a person stepping from one tread member to the other and means for preventing false registrations resulting from concurrent fortuitous release of one tread member and depression of the other.

7. A device for automatically registering the number of persons passing through a doorway or the like comprising depressible tread members on either side of the doorway, registering means actuated by the release of one tread member and the depression of the other tread member by a person stepping from one tread member to the other, means for preventing false registrations resulting from concurrent fortuitous release of one tread member and depression of the other and means for insuring correct registration if a person passes through the doorway during such fortuitous actuation of said tread members.

8. A device for automatically registering the number of persons passing through a doorway or the like, comprising depressible tread members on either side of the doorway, registering means actuated by the release of one tread member and the depression of the other tread member by a person stepping from one tread member to the other, means for preventing false registrations resulting from concurrent fortuitous release of one tread member and depression of the other, and means insuring registering of persons even though normal functioning of the device is interfered with by the presence of others on said tread members.

9. A device for automatically registering the number of persons passing through a doorway or the like comprising a plurality of depressible tread members on each side of the doorway, one of said members on each side entirely covering the other tread members on said side, registering means actuated by the release of the upper tread member on one side of the doorway and the depression of the upper tread member on the other side of the doorway by a person stepping from one tread member to the other and means actuated by the lower tread members for insuring correct registration when the normal functioning of said upper tread members is interfered with.

10. A device of the kind described, comprising a plurality of tread members, part of them outside an entry way, the remainder inside the entry way, each of which tread members is operatively connected to two electrical contactors adapted to make one set of electrical contacts during the interval while the corresponding tread member on the other side of the doorway is being depressed, and another set of electrical contacts during the interval when said tread on the other side of the doorway is being released and said first tread is being depressed.

11. A device of the kind described, comprising a pair of primary tread members, one just outside, the other just inside an entry way, each hydraulically connected to a gauge responsive to change of pressure, registering devices, said response in each case actuating one set of electrical contacts during an increase of pressure and another set of electrical contacts during a release of pressure, thus normally completing an electrical circuit through one registering device when one primary tread is being compressed while the other is being released, and through another registering device when the former tread is being released while the latter is being compressed.

12. A device of the kind described, comprising a pair of primary tread members one just outside, the other just inside an entry way, each operatively connected to a gauge responsive to change of pressure, registering devices, said response in each case actuating one set of electrical contacts during an increase of pressure and another set of electrical contacts during a release of pressure, thus normally completing an electrical circuit through one registering device when one primary tread is being compressed while the other is being released, and through another registering device when the former tread is being released while the latter is being compressed.

13. A device of the kind described, comprising a pair of primary tread members, one just outside, the other just inside an entry way, each operatively connected to a gauge responsive to change of pressure, registering devices, said response in each case actuating one set of electrical contacts during an increase of pressure and another set of electrical contacts during a release of pressure, thus normally completing an electrical circuit through one registering device when one primary tread is being compressed while the other is being released, and through another registering device when the former tread is being released while the latter is being compressed, a pair of auxiliary tread members under each primary tread member, each operatively connected to a gauge responsive to change of pressure, said response in each case actuating one auxiliary set of electrical contactors during an increase of pressure, and another auxiliary set of electrical contactors during a decrease of pressure, said auxiliary contactors being electrically interconnected through auxiliary electromagnetic differential relays to actuate said registering devices so that the auxiliary treads serve as a substitute for the primary treads when fortuitous movement of the latter would otherwise render them inoperative.

14. A device of the kind described, comprising a pair of primary tread members, one just outside, the other just inside an entry way, each operatively connected to a gauge responsive to change of pressure, registering devices said response in each case actuating one set of electrical contacts during an increase of pressure and another set of electrical contacts during a release of pressure, thus normally completing an electrical circuit through one registering device when one primary tread is being compressed while the other is being released, and through another registering device when the former tread is being released while the latter is being compressed; a pair of auxiliary tread members each under primary tread member, each operatively connected to a gauge responsive to change of pressure, said response in each case actuating one auxiliary set of electrical contactors during an increase of pressure, and another auxiliary set of electrical contactors during a decrease of pressure, said auxiliary contactors being electrically interconnected through auxiliary electromagnetic differential relays to actuate said registering devices so that the auxiliary treads serve as a substitute for the primary treads when fortuitous movements of the latter would otherwise render them inoperative and electromagnets operating tripping switches adapted to prevent false registrations, either inbound or outbound, due to simultaneous depression of one primary tread and release of the other, said tripping coils being actuated by contactors operated by a pair of auxiliary treads.

15. In a device of the kind described, a pair of tread members on either side of a doorway and registering devices actuated by the depression of one of said members as the other is released, one of said tread members being higher than the other to prevent a person from depressing or releasing both at the same time.

16. In a device of the kind described, a pair of tread members on either side of a doorway and registering devices actuated by the depression of one of said members as the other is released, said tread members being in close proximity to each other to prevent a person from stepping in the space therebetween.

17. A device for automatically registering the number of persons passing through a doorway or the like comprising paired depressible tread members, one pair on each side of said doorway, primary tread members on each side of said doorway, each primary tread member covering a pair of said first mentioned tread members, said pairs being auxiliary to said primary tread members, said primary tread members cooperating in actuating two electrical circuits, each circuit including a normally closed tripping switch, a registering device for each of said circuits, an electromagnet for actuating each register, other electromagnets, one for each tripping switch, said auxiliary tread members actuating electrical circuits that cooperate with said primary tread circuits to operate said tripping switches and that cooperate with the circuits of said register-actuating electromagnets to by-pass the contactors of said primary circuits.

18. In a registering device for automatically registering on one register the number of persons entering a doorway, and on another register the number of persons leaving the same doorway, the combination on each side of said doorway of a set of three compressible tread members, one of which, the primary tread member, completely covers the other two auxiliary tread members which lie side by side below it, in the direction of entrance to, or egress from, said doorway; and in which each of the several tread members is operatively connected to each of a pair of electrical contactors, one of which responds to an increase of pressure, the other to a decrease of pressure on its associated tread member, but only during the interval of increase or decrease of pressure, respectively; a pair of electromagnets for actuating the registers, another pair of electromagnets for actuating tripping switches (normally closed) one in each of the circuits supplying the aforesaid registering electromagnets, and a pair of differentially wound electromagnets, together with wiring circuits associated with these several electromagnets, with the several tread actuated contactors, and with a common source of electrical current.

19. In a registering device for automatically registering on one register the number of persons entering a doorway, and on another register the number of persons leaving the same doorway, the combination on each side of said doorway of a set of three compressible tread members, one of which, the primary tread member, completely covers the other two auxiliary tread members which lie side by side below it, in the direction of entrance to, or egress from, said doorway; and in which each of the several tread members is operatively connected to each of a pair of electrical contactors, one of which responds to an increase of pressure, the other to a decrease of pressure on its associated tread member, but only during the interval of increase or decrease of pressure, respectively; a pair of electromagnets for actuating the registers, another pair of electromagnets for actuating tripping switches (normally closed) one in each of the circuits supplying the aforesaid registering electromagnets, and a pair of differentially wound electromagnets, together with wiring circuits associated with these several electromagnets, with the several tread actuated contactors, and with a common source of electrical current; the contactor associated with one of its primary tread members, and which responds to an increase of pressure thereon, serving to establish a connection from the source of current through one of the registering electromagnets, to that one of the contactors associated with the other primary tread member which responds to a decrease of pressure thereon, thence back to the source of current but through one of said tripping switches, which is normally closed; an exactly similar circuit being provided by the remaining pair of contactors associated with the primary tread members, through the remaining registering electromagnet and its associated, normally closed, tripping switch; the electrical circuits of the two pairs of contactors associated with the auxiliary tread members lying side by side under one of the primary tread members being cross-connected in such a manner that if the auxiliary tread situated nearest to the doorway is depressed while the other auxiliary tread of the pair is released, a circuit is established from the source of current through the aforesaid contactors to one winding of one of the differential electromagnets, and back to the source of current, thereby closing a contact which by-passes the contactor of the primary tread member which normally responds to an increase of pressure; an additional cross-connection providing that if the auxiliary tread situated nearest to the doorway is released, while the other auxiliary tread of the pair is depressed, another circuit is established from the source of current through one winding of the second differential electromagnet, thence back to the source of current, thereby closing a contact which by-passes that contactor of the primary tread member of the set in question which normally responds to a decrease of pressure; exactly similar connections being provided with respect to the two pairs of contactors associated with the remaining pair of auxiliary tread members lying under the second primary tread member; the two windings of each differential electromagnet being grouped so that one winding, associated with a depression of an auxiliary tread remote from the door, is paired with a winding associated with the release of the other remote auxiliary tread; and conversely for the remaining windings of the other differential electromagnet; each coil of the electromagnets which operate the tripping switches of the registering electromagnets being included in a circuit, which beginning at the source of current, includes a contactor operated by the depression of one auxiliary tread remote from the doorway, in series with another contactor operated by the release of the other auxiliary tread remote from the doorway; and in series with this circuit being a two-way branched path, back to the battery, by way of auxiliary contacts which are arranged to be open circuited if the auxiliary tread paired with the first above mentioned, and the auxiliary tread paired with the second above mentioned, are simultaneously depressed and released, respectively.

20. A device of the kind described, comprising a pair of compressible liquid filled tread members on either side of a doorway, a Bourdon tube connected with the interior of each tread member, a pair of centrifugal devices for each Bourdon tube, drive connections for actuating one centrifugal device when the pressure in said tube is increased and for actuating the other centrifugal device when said pressure is decreased, electrical circuits including contactors actuated by said centrifugal devices and registering devices actuated by closing of said circuits, one circuit being closed by compression of one tread member and release of the other, and the other circuit being closed by release of said first tread member and compression of the other.

Signed at St. Louis, Missouri, this 3 day of July, 1929.

CHARLTON MESSICK.
ALEXANDER S. LANGSDORF.